(12) United States Patent
Sohn et al.

(10) Patent No.: US 8,388,740 B2
(45) Date of Patent: Mar. 5, 2013

(54) SIMPLIFIED PROCESS TO REMOVE DISSOLVED OXYGEN FROM HYDROCARBON STREAMS

(75) Inventors: Stephen W. Sohn, Arlington Heights, IL (US); Steven P. Lankton, Wheeling, IL (US); Debarshi Majumder, Forest Park, IL (US); Brian J. Schiavone, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 213 days.

(21) Appl. No.: 12/913,243

(22) Filed: Oct. 27, 2010

(65) Prior Publication Data
US 2012/0103194 A1    May 3, 2012

(51) Int. Cl.
*B01D 19/00*    (2006.01)
(52) U.S. Cl. ............... 95/245; 95/263; 95/264; 95/265; 95/262; 95/260
(58) Field of Classification Search ............ 95/263, 95/264, 265, 260, 245, 262
See application file for complete search history.

(56) References Cited

U.S. PATENT DOCUMENTS

| | | | | |
|---|---|---|---|---|
| 2,315,843 A | * | 4/1943 | Drennan et al. | 208/208 R |
| 2,469,917 A | * | 5/1949 | Curtis | 95/254 |
| 3,229,446 A | * | 1/1966 | Sebastian et al. | 95/265 |
| 3,722,180 A | * | 3/1973 | Boucher et al. | 95/254 |
| 6,315,815 B1 | | 11/2001 | Spadaccini | |
| 6,709,492 B1 | | 3/2004 | Spadaccini | |
| 7,153,343 B2 | | 12/2006 | Burlatsky | |
| 7,435,283 B2 | | 10/2008 | Tillman | |
| 7,459,081 B2 | | 12/2008 | Koenig | |
| 2009/0020013 A1 | | 1/2009 | Sloan | |

OTHER PUBLICATIONS

Web page: http://www.komax.com/Gas-Liquid-Contacting.html.
Zhou, Catalytic Hydrogenation Process Simulating Evaluation of Removing Oxygen Dissolved in Kerosene, Modern Chemical Industry, vol. 26, n7, p. 55-57, Jul. 2006.
Darrah, Jet Fuel Deoxygenation, Technical Report AFWAL-TR-88/2081, Geo-Centers, Inc, Newton Centre, MA, Oct. 1988, Aero Propulsion Laboratory, Air Force Wright Aeronautical Laboratories, Air Force Systems Command, Wright-Patterson Air Force Base, Ohio, USA.
Ervin, Effects of Reduced Dissolved Oxygen Concentration on Jet Fuel Deposit Formation, Symposium on Coke Formation and Mitigation presented before the Division of Petroleum Chemistry, Inc., 210th National Meeting, American Chemical Society, Chicago, IL, USA, Aug. 20-25, 1995, pp. 660-665.
Furimsky, Catalytic Removal of Sulfur, Nitrogen, and Oxygen from Heavy Gas Oil, AIChE Journal, vol. 25, No. 2, pp. 306-311, Mar. 1979.

* cited by examiner

*Primary Examiner* — Duane Smith
*Assistant Examiner* — Douglas Theisen
(74) *Attorney, Agent, or Firm* — Arthur E. Gooding

(57) ABSTRACT

A process is presented for the removal of dissolved oxygen from hydrocarbon streams. The hydrocarbons streams include kerosene and jet fuels. The process includes mixing the hydrocarbons streams with an oxygen free gas to form a gas-liquid mixture. The mixture is allowed to disengage into a gas stream and a liquid stream, thereby removing dissolved oxygen from the hydrocarbon stream.

20 Claims, 1 Drawing Sheet

SIMPLIFIED PROCESS TO REMOVE DISSOLVED OXYGEN FROM HYDROCARBON STREAMS

FIELD OF THE INVENTION

The present invention relates to the processes of treating fluids. In particular, the invention relates to the treatment of fuels to remove oxygen contaminated materials.

BACKGROUND OF THE INVENTION

Chemicals, and in particular, hydrocarbon mixtures, that are stored for extended periods of time can become contaminated, or in the presence of contaminants accumulate deposits that are detrimental to the equipment through which the chemicals flow. In particular, fuels can often sit in storage containment units, such as storage tanks or shipping vessels. The fuels are usually hydrocarbon mixtures, and contaminants in the fuels can bring about some polymerization or the creation of gums. These molecules can impair the performance of engines which run on the fuel. The gums or other materials can create deposits, that impair flow, or heat transfer characteristics in an engine, which in turn can impair engine performance.

An important contaminant is oxygen. Oxygen contaminants lead to undesirable chemical products by a variety of reaction processes. These reactions include autocatalytic mechanisms that include free radical chain reactions. Olefins in the presence of oxygenate contaminants can lead to polymerization of the olefin monomers and can lead to deposits of large polymeric molecules. Fouling causes increased maintenance of equipment, and reduces operation times, and a loss of production.

The removal of oxygen and residual oxygen contaminants from hydrocarbon feedstocks can reduce the down times and protect equipment from excessive fouling due to deposits created from reactions by the presence of oxygen in the hydrocarbon feedstocks.

SUMMARY OF THE INVENTION

Oxygen contamination in a jet fuel, or in kerosene is an important problem. The present invention provides a method of removing residual dissolved oxygen and oxygen containing compounds to prevent the problems associated with the presence of oxygen in either a jet fuel or kerosene. It has been unexpectedly found that a simple, yet effective means of removing oxygen is to intimately and vigorously mix the jet fuel or kerosene with an oxygen free gas, and to subsequently separate the gas and liquid. This removes the oxygen from the jet fuel or kerosene. The mixed jet fuel or kerosene and gas are passed to a separation vessel, where the gas and liquid phases separate. The separated gas is drawn off the top of the vessel, and the liquid phase is drawn off at a point from the vessel below the gas liquid interface. Typically, the draw off port for the liquid will be located on the bottom of the vessel.

Additional objects, embodiments and details of this invention can be obtained from the following drawings and detailed description of the invention.

DETAILED DESCRIPTION OF THE INVENTION

Figure 1:
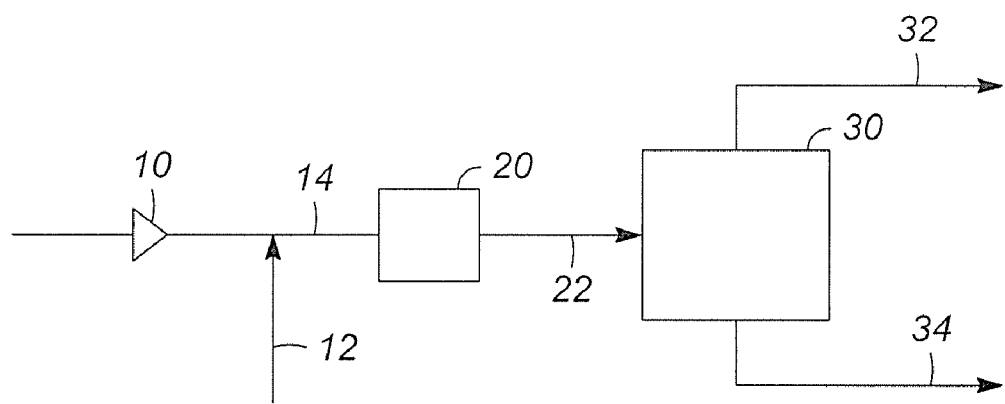
FIG. 1 is a diagram of the process.

Oxygen contamination can reduce the quality of many organic streams. Oxygen or oxygenate contamination in kerosene, and jet-fuel which is derived from kerosene, can have deleterious effects on the specifications. The contamination can come about in numerous ways. One example is by contacts with atmospheric oxygen in an unblanketed storage container or shipping vessel. During the transit time and storage time oxygen is dissolved into the kerosene. Another example is through mercaptan sweetening in the making of jet fuel. The production of jet fuel from kerosene requires several processing steps such as hydroprocessing or mercaptan sweetening. During the mercaptan sweetening process, oxygen is contacted with the kerosene, and some of the oxygen is residual in the jet fuel after the processing.

In jet turbine engines on aircraft, the jet fuel is circulated between the fuel tanks and the engines to control the engine temperatures. Using jet fuel as a thermal sink for the engine temperatures heats up the jet fuel. During these normal processes, the jet fuel is heated and residual oxygen and oxygenates that are in the jet fuel can react and polymerize to form gums and deposits in the jet fuel circulation system, and in the jet fuel lines to the engines. These deposits change the heat transfer characteristics of the engine, and can affect the flow through the fuel lines resulting in a reduction in the engine performance. In addition, jet fuel and kerosene can be used as a feedstock for the production of normal paraffins in the C10 to C16 range. These normal paraffins are used in the production of linear alkylbenzenes (LAB). LABs are used in the production of biodegradable detergents. During the process of normal paraffin extraction, the kerosene is heated. The heating of the kerosene in the presence of oxygen dissolved in the kerosene can cause polymerization reactions that in turn can result in gums and polymer formation. These gums and polymers result in the fouling of equipment by creating deposits on the equipment and resulting in increased down time of the processes, and subsequent loss of production.

The oxygen in kerosene is a precursor to hydroperoxides. The hydroperoxide species react using a free radical mechanism to form polymers. The present invention uses a specific set of conditions to strip oxygen from kerosene, and from jet fuel in a controlled fashion resulting in a kerosene and jet fuel product stream with a reduced, and almost negligible, tendency to form polymers or gums.

Normally, the removal of dissolved oxygen from a hydrocarbon stream involves heating the stream and stripping the oxygen in a stripping unit. For purposes of all subsequent descriptions, the term kerosene when used will include hydrocarbon streams derived from kerosene. Unexpectedly, it was found that oxygen can be more easily removed from kerosene. This minimizes additional equipment and the amount of energy needed to remove the oxygen. In addition, the amount of stripping gas is substantially smaller than for other processes to remove oxygen. The present invention is a much simpler retrofitting of the process into an existing kerosene plant.

The results from ongoing pilot plant tests indicate that O2 removal is easier than previously believed, and has led to a new conception for the removal of O2. The present invention comprises intimately and vigorously mixing a kerosene stream with an oxygen free gas stream to create a stream comprising a mixture of gas and liquid. The mixed stream is passed to a separation vessel for the separation of the gas and liquid to create a liquid phase comprising the stripped kerosene and a gas phase. The gas phase is drawn off through a port at the top of the separation vessel, and the stripped kerosene is drawn off from the bottom of the separation vessel. The mixing should be intimate enough such that the liquid phase envelopes tiny bubbles of gas, rather than large bubbles of gas. It is preferred that the mixers will disperse the gas into bubbles on the order of a few millimeters or smaller, to maximize the interfacial contact between the liquid and gas, and to facilitate the stripping of oxygen from the liquid phase.

The mixing of the oxygen free gas with the kerosene pulls out dissolved oxygen from the kerosene. The mixing an amount of gas with the kerosene to form a mixture that is less than 5 mass percent of gas. Preferably the amount of gas is less than 2 mass percent, and more preferably the amount is between 0.01 and 1 mass percent. The amount of gas based upon mass is dependent upon the molecular weight of the gas, for it is the moles, or partial pressure, of the gas that determines the mass range. While it is preferred that the mixing gas be oxygen free, low amounts of oxygen in the mixing gas are acceptable. The equilibrium will also remove oxygen from the kerosene if the mixing gas has a sufficiently low oxygen content to drive the dissolved oxygen from solution into the gas phase. Where the term oxygen free is used, in the context of the present invention, low oxygen is also intended to be included.

The range of gas flow rates to be mixed with 100,000 kg/hr of kerosene, is between 2.5 and 35 kg-mol/hr, with a preferred minimum range of the gas between 6.5 and 15 kg-mol/hr, and with a more preferred range of the gas between 9 and 11 kg-mol/hr. This translates to the following values for mass flow rates for different gases as shown in Table 1.

TABLE 1

| gas | M.W | 2.5 kg-mol/hr | 35 kg-mol/hr | 9 kg-mol/hr | 11 kg-mol/hr |
|---|---|---|---|---|---|
| N2 | 28 | 70 | 980 | 252 | 308 |
| H2 + lt. HCs | 3.76 | 9.4 | 131.6 | 33.84 | 41.36 |
| H2 | 2 | 5 | 70 | 18 | 22 |
| H2O | 18 | 45 | 630 | 162 | 198 |
| CH4 | 16 | 40 | 560 | 144 | 176 | mass flow rates of gases in kg/hr for 100,000 kg/hr of kerosene

From the Table, it can be computed that the gas will comprises between 0.005 mass percent and 1 mass percent of the gas-kerosene mixture, with a preferred range between 0.01 and 0.3 mass percent. While the Table 1 lists hydrogen, nitrogen, steam, and a mixture of hydrogen and light hydrocarbons, and methane, the use of other oxygen free gases will also work, and can include inert gases such as argon, and many of the light gases generated in a refinery, and mixtures thereof. The methane (CH4) can include some other light HCs and some hydrogen. The light hydrocarbons listed in Table 1 include predominantly methane (CH4), ethane (C2H6), and propane (C3H8). Small amounts of other components may also be present. While steam is listed as a possible gas, at lower temperatures, steam is not preferred as the steam will condense.

The process is carried out at a temperature below 130° C., to prevent any reactions that might take place with the oxygen. A preferred temperature is between 0° C. and 80° C. A low pressure is preferred in the separation vessel to facilitate the separation of has from the liquid phase. A preferred pressure in the separation vessel is between 100 kPa and 350 kPa (absolute), and a more preferred pressure is between 100 kPa and 200 kPa (absolute). The separation vessel is blanketed with an oxygen free gas, and the blanketing gas will usually be the same gas as the gas mixed with the kerosene. The separation vessel is sized to have sufficient residence time for the disengagement of the gas from the gas-liquid mixture. A minimum disengagement time is 5 minutes, with a preferred disengagement time to be greater than 10 minutes.

The process is shown in FIG. 1, where a oxygen free stream 12 is added to a kerosene stream 10. The mixed stream 14 is passed to a mixing unit 20 where the gas and liquid are intimately comingled. Mixers for use in the mixing unit 20 must be able to handle the mixing of two fluids having significantly different densities and viscosities, such as a gas and liquid. The mixer must also be of a design that mixes a relatively large amount of liquid with a relatively small amount of gas. The terms relatively large and relatively small refer to the components, the gas and liquid, in the mixture, where the gas makes up less than 5 mass percent of the mixture and the liquid makes up more than 95 mass percent of the liquid. Static mixers are available that can perform this kind of mixing, but the process is not limited to static mixers. The intimately mixed stream 22 is passed to a separation vessel 30 where the fluid in the stream is allowed to separate into a gas phase and liquid phase. The gas phase is drawn off the upper portion of the separation vessel 30 in a gas line 32. The liquid phase is drawn off the lower portion of the separation vessel 30 in a liquid line 34.

Figure 2:
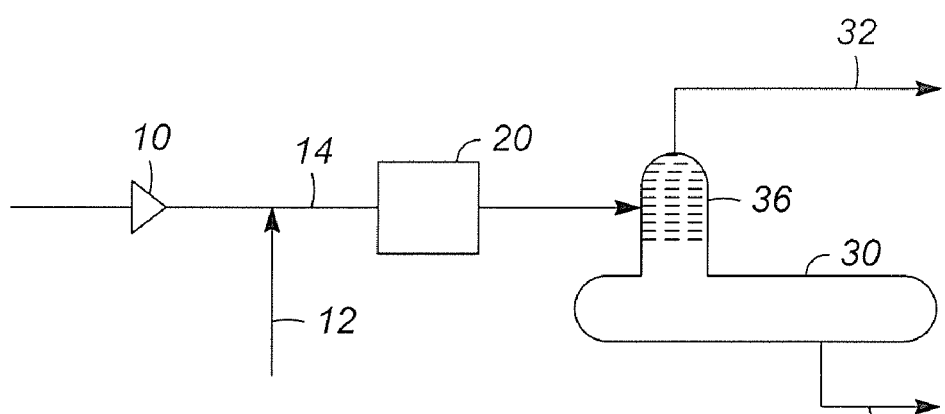
FIG. 2 is a diagram of a second embodiment of the process.

The intimately mixed stream 22 can be passed to a separation vessel 30 of sufficient size to provide a residence time of the liquid that is greater than 5 minutes, and preferably greater than 10 minutes. The separation vessel 30 can also be designed to facilitate the disengagement of gas and liquid, as shown in FIG. 2. A second embodiment uses a separation vessel with a disengagement section 36. The disengagement section 36 facilitates the spreading of the mixture, by increasing the gas-liquid interface of the mixture, to allow the gas to rapidly disengage from the liquid.

One design for the disengagement section 36 comprises a series of plates that is disposed on the top of the separation vessel. The liquid spreads over the plates and travels across the plates as the liquid travels down the disengagement section 36. The gas, as it disengages from the flowing mixture, flows upward through the disengagement section 36 and is passed out through to the gas line 32. The plates can be solid, extending part way across the disengagement section 36, or can be plates, or trays, used in gas-liquid contacting, where the plates are perforated, or include holes with chimneys to facilitate the flow of gas up through the disengagement section 36. The use of the term chimneys is meant to be a short tube that allows gas to flow through, while limiting the liquid flow down through the hole.

Another possible structure for the disengagement section 36 can include packing material that has large void spaces to create a large gas-liquid interface, while facilitating the flow of gas upward through the disengagement section 36.

The present invention is intended to include a plurality of mixer and separator devices, wherein the kerosene is drawn off from a first separation vessel, and mixed with an oxygen free gas, passing through a second mixer, thereby creating a second intimately mixed kerosene and gas mixture. The second intimately mixed kerosene and gas mixture is passed to a second separator wherein the gas disengages from the mixture and is drawn off the top of the separation vessel, and the kerosene is drawn off the bottom of the separation vessel. In another embodiment, the first separation vessel can be used for the separation of both the first mixture and the second mixture where the second mixture is passed back to the first separation vessel, and the vessel is sized to provide sufficient disengagement time for both mixtures.

Although the completeness of removal of O2 from kerosene with this new process might be less complete than a process involving heating and stripping, there is still a significant reduction in the amount of O2 in the kerosene, and for many purposes, the amount removed is sufficient to significantly reduce fouling.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for stripping oxygen from a kerosene stream comprising:
   mixing an oxygen free gas stream into a kerosene stream creating a mixed kerosene stream, wherein the amount of oxygen free gas to the kerosene in the mixed kerosene stream is less than 5 mass percent;
   passing the mixed kerosene stream to a separation vessel, thereby allowing separation of gas from the kerosene stream to create a stripped kerosene and a gas phase;
   drawing off the gas phase from the top of the separation vessel; and
   drawing off a stripped kerosene from the bottom of the separation vessel.

2. The process of claim 1 wherein the amount of oxygen free gas to kerosene in the mixed kerosene stream is between 0.01 and 1 mass percent.

3. The process of claim 1 wherein the operating temperature is below 130° C.

4. The process of claim 1 wherein the separation vessel is blanketed with oxygen free gas.

5. The process of claim 4 wherein the oxygen free gas is selected from the group consisting of nitrogen, argon, hydrogen, steam, and mixtures thereof.

6. The process of claim 4 wherein the oxygen free gas is a net gas from a hydrocarbon processing unit comprising light hydrocarbons and hydrogen.

7. The process of claim 1 wherein the kerosene and oxygen free gas are mixed with a static mixer.

8. The process of claim 1 wherein the mixed kerosene stream is passed to a gas disengagement section of the separation vessel.

9. The process of claim 8 wherein the gas disengagement comprises spreading the mixed kerosene stream over a surface to increase the gas-liquid interface.

10. The process of claim 9 wherein the spreading of the mixed kerosene stream is over a series of plates.

11. The process of claim 10 wherein the plates are perforated.

12. The process of claim 8 wherein the spreading of the mixed kerosene stream is over packing material.

13. The process of claim 1 wherein the pressure in the separation vessel is between 100 kPa and 350 kPa absolute.

14. The process of claim 1 where the separation vessel is sized to allow for a disengagement time greater than 5 minutes.

15. The process of claim 14 where the separation vessel is sized to allow for a disengagement time of at least 10 minutes.

16. The process of claim 1 further comprising:
   mixing an oxygen free gas stream into the stripped kerosene stream creating a second mixed kerosene stream;
   passing the second mixed kerosene stream to a second separation vessel, thereby allowing separation of gas from the kerosene stream to create a second stripped kerosene and a second gas phase;
   drawing off the second gas phase from the top of the second separation vessel; and
   drawing off a second stripped kerosene from the bottom of the second separation vessel.

17. A process for stripping oxygen from a kerosene stream comprising:
   mixing an oxygen free gas stream into a kerosene stream creating a mixed kerosene stream, wherein the gas comprises less than 2 mass percent of the mixed stream;
   passing the mixed kerosene stream to a separation vessel, operated at a temperature below 130° C. and at a pressure between 100 kPa and 350 kPa absolute, thereby allowing separation of gas from the kerosene stream to create a stripped kerosene and a gas phase, wherein the separation vessel is sized to allow a gas-liquid disengagement of more than 5 minutes;
   drawing off the gas phase from the top of the separation vessel; and
   drawing off a stripped kerosene from the bottom of the separation vessel.

18. The process of claim 17 wherein the amount of oxygen free gas to kerosene in the mixed kerosene stream is between 0.01 and 1 mass percent.

19. The process of claim 17 wherein the oxygen free gas is selected from the group consisting of nitrogen, argon, hydrogen, steam, light hydrocarbon gases and mixtures thereof.

20. The process of claim 17 where the separation vessel is sized to allow for a disengagement time of at least 10 minutes.

* * * * *